United States Patent [19]

van der Lely et al.

[11] 4,366,666
[45] Jan. 4, 1983

[54] HAYMAKING MACHINE

[75] Inventors: Cornelis van der Lely, Zug, Switzerland; Cornelis J. G. Bom, Rozenburg, Netherlands

[73] Assignee: C. van der Lely N.V., Maasland, Netherlands

[21] Appl. No.: 177,137

[22] Filed: Aug. 11, 1980

[30] Foreign Application Priority Data

Aug. 24, 1979 [NL] Netherlands .................. 7906381

[51] Int. Cl.³ .................................... A01D 79/00
[52] U.S. Cl. ................................ 56/370; 56/228
[58] Field of Search .................. 56/370, 228, 6, 7

[56] References Cited

U.S. PATENT DOCUMENTS

| | | | |
|---|---|---|---|
| 3,527,032 | 9/1970 | Wood | 56/6 |
| 3,638,977 | 2/1972 | Purrer | 56/370 |
| 3,897,832 | 8/1975 | Oceedahl et al. | 56/228 |
| 4,149,364 | 4/1979 | Aron | 56/370 |
| 4,178,744 | 12/1979 | Allely et al. | 56/228 |

FOREIGN PATENT DOCUMENTS

| | | | |
|---|---|---|---|
| 2501563 | 7/1975 | Fed. Rep. of Germany | 56/370 |
| 2517651 | 10/1975 | Fed. Rep. of Germany | 56/370 |

Primary Examiner—J. N. Eskovitz
Attorney, Agent, or Firm—William B. Mason

[57] ABSTRACT

A haymaking machine has a substantially horizontal main frame beam with lateral carriers which are pivotable upwardly and downwardly relative to the main beam. The pivots define horizontal axes and pivoting takes place between a working position in which the beam and carriers are substantially horizontally aligned, and an inoperative transport position in which the carriers are turned upwardly relative to the frame beam through 90° or more. Breakage of, or other serious damage to the drive transmission to rotary rake members of the machine is prevented by drivingly connecting a rotary shaft within the main frame beam to the rotary shaft segments housed within the carrier by double universal couplings which still allow the shaft segments to be driven when they are inclined to the main beam at 90° or more. Also, the carriers mount crop guides that can be pivoted about horizontal axes and/or displaced relative to the rake members so as to function during either tedding or swath forming. The carriers can mount latch pins that are engaged by respective latches on the main beam and the latches have recesses that prevent excessive pivoting as well as retain the carriers in transport position.

26 Claims, 10 Drawing Figures

HAYMAKING MACHINE

This invention relates to haymaking machines of the kind which comprise at least two drivable and rotary shafts that are supported by a frame beam and by a carrier, respectively, and that are relatively pivotable with respect to one another, said shafts being interconnected by a universal coupling and the frame beam and carrier being pivotally interconnected so as to be upwardly and downwardly angularly displaceable relative to each other.

Known haymaking machines of this kind can have their drive transmissions broken or otherwise badly damaged by the erroneous application of drive to such transmissions when the or each carrier is tilted upwardly through a large angle into an inoperative transport position and an object of the invention is to avoid, or very greatly to reduce, this danger.

According to the invention, there is provided a haymaking machine of the kind set forth, wherein said shafts are interconnected by a double universal coupling.

For a better understanding of the invention, and to show how the same may be carried into effect, reference will now be made, by way of example, to the accompanying drawings, in which.

Figure 1:
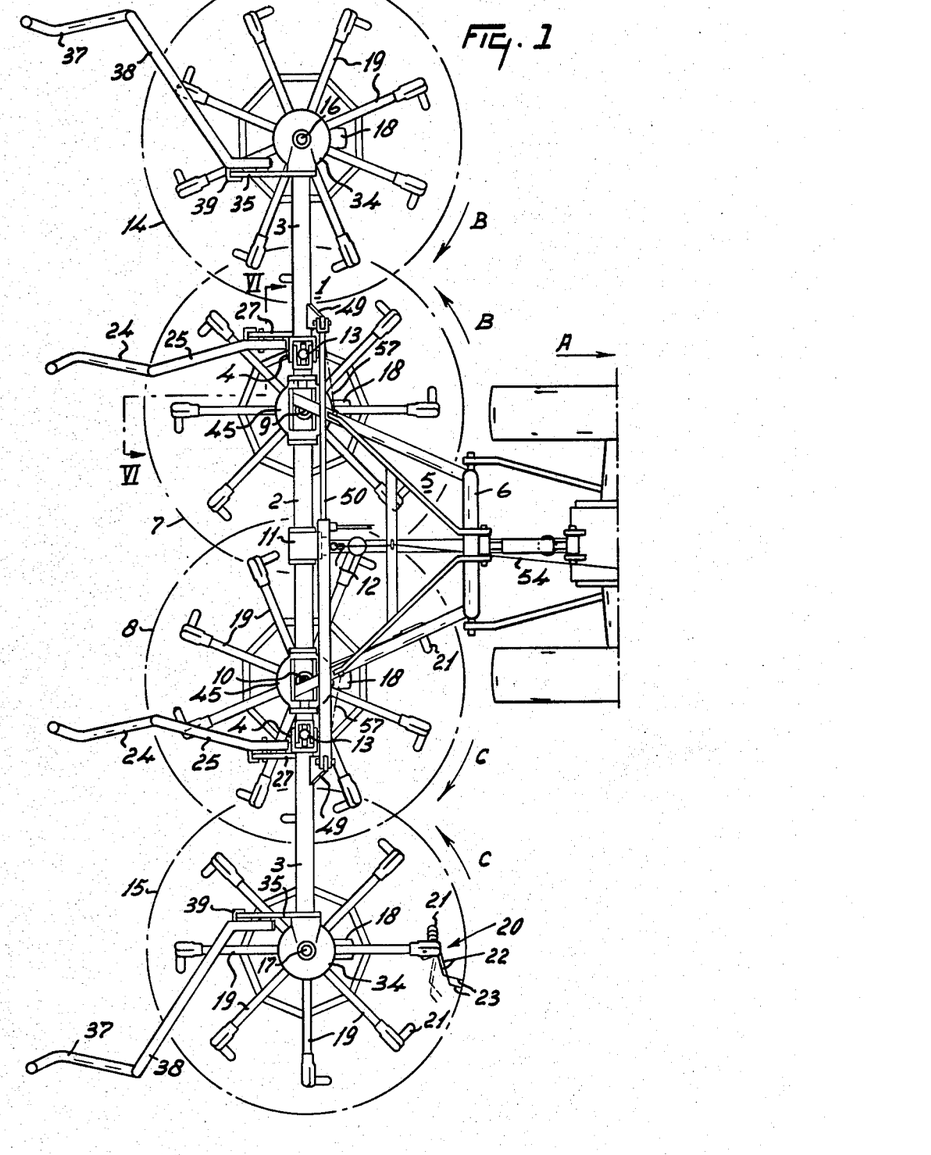
FIG. 1 is a plan view of a haymaking machine shown connected to the rear of an agricultural tractor.

Referring to the accompanying drawings, the haymaking machine which is shown in plan view in FIG. 1 thereof comprises a frame 1 which extends substantially horizontally perpendicular to the intended direction of operative travel A of the machine although such perpendicular disposition is not essential and said frame 1 could be disposed obliquely with respect to the direction A. In any case, the frame 1 extends throughout the greater part of the working width of the machine and comprises a rigid central portion in the form of a main frame beam 2. The opposite ends of the main frame beam 2 have the ends of two beam-formation carriers 3 connected to them so as to be pivotable relative to the main frame beam 2 about corresponding substantially horizontal axes 4 but both axes 4 extend substantially parallel to the direction A when the machine is disposed as illustrated with the frame 1 in substantially horizontally perpendicular relationship with the direction A.

Figure 10:
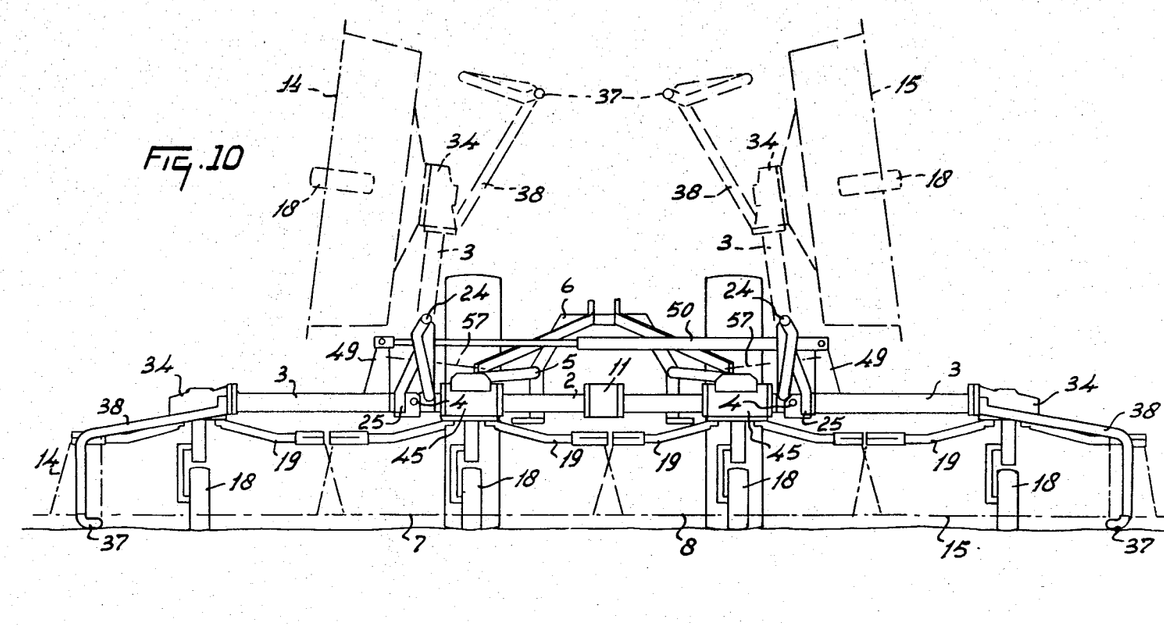
FIG. 10 is a rear elevation, to the same scale as FIG. 1, showing the haymaking machine in an operative position in full lines and in an inoperative transport position in broken lines.

A tie structure 5 is located centrally of the front (with respect to the direction A) of the main frame beam 2 and connects that frame beam to a coupling member or trestle 6 that is of arched configuration (see FIG. 10) and that is constructed and arranged for connecting the frame 1 of the machine to the three-point lifting device or hitch at the rear of an agricultural tractor (or other operating vehicle) that is shown in FIGS. 1 and 10 of the drawings. The coupling member or trestle 6 is formed from at least one tubular beam and may be considered as having an inverted U-shaped configuration as seen in front or rear elevation. The coupling member or trestle 6 is provided at the lowermost free ends of its two limbs, and at its top, with coupling points that enable it to be connected to the three-point lifting device or hitch as shown somewhat diagrammatically in both FIGS. 1 and 10 of the drawings.

Figure 7:
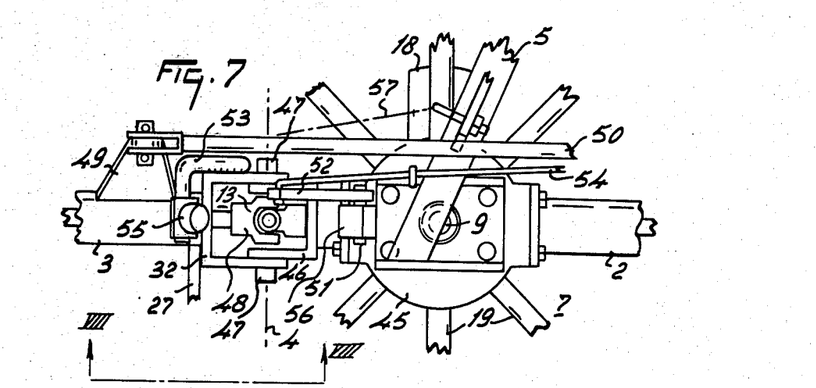
FIG. 7 is a plan view as seen in the direction indicated by an arrow VII in FIG. 6.

Two rotary rake members, rake wheels or rake heads 7 and 8 (herein after referred to only as "rake members" for the sake of brevity) are mounted at locations close to the opposite ends of the main frame beam 2, and thus close to the two substantially horizontal axes 4, so as to be rotatable about corresponding substantially vertical axes 9 and 10 which axes, when operating on horizontal land, are not strictly vertically disposed but are so orientated that upper points thereon are a little further forward with respect to the direction A than are the points at which said axes intersect the ground surface. A gear box 11 is arranged centrally along the length of the main frame beam 2 and has a forwardly projecting substantially horizontally disposed rotary input shaft 12 which, as shown diagrammatically in FIG. 1, can be placed in driven connection with the rear power take-off shaft of an agricultural tractor or other operating vehicle through the intermediary of a telescopic transmission shaft of known construction having universal joints at its opposite ends. The gear box 11 has two axially aligned output shafts (which may, in fact, be the opposite ends of a single shaft), said output shafts being located internally of the hollow main frame beam 2 in such a way that their free ends (remote from the gear box 11) are located close to the respective substantially horizontal axes 4 where they carry corresponding universal joints 13 (FIG. 7). Each universal joint 13 drivingly couples the end of the output or driving shaft which is located axially inside the respective half of the main frame beam 2 to one end of a corresponding driving shaft which extends axially through the adjoining carrier 3. Gear boxes adjacent the free ends of the main frame beam 2 and gear boxes at the outer free ends of the two carriers 3 are arranged to transmit drive from the shafts inside the main frame beam 2 and inside the carriers 3, respectively, to the two rake members 7 and 8 and to two further similar rake members 14 and 15 which latter are rotatably mounted at the free outer ends of the two carriers 3. The transmission members inside these four gear boxes are of a simple known construction and, since they do not form the subject of the present invention, they are not illustrated in the drawings and will not be described in detail. The two rake members 14 and 15 that are located at the free ends of the respective two carriers 3 are rotatable about corresponding substantially vertical axes 16 and 17 which axes, when the machine is disposed in a working position and is located on flat horizontal ground, will be parallel or very nearly parallel to the two axes 9 and 10.

Each of the four rake members 7, 8, 14 and 15 is supported from the ground surface by a corresponding ground wheel 18 (FIGS. 1, 6 and 10), each ground wheel 18 being upwardly and downwardly adjustable in level relative to the frame 1 in a manner which is known per se and which does not form the subject of the present invention, principally to enable the clearance between groups of tines 20 of the rake members 7, 8, 14 and 15 and the ground surface to be adjusted. The four rake members 7, 8, 14 and 15 of the machine have a combined total working width of substantially six meters, each individual rake member having an overall diameter of substantially 1.75 meters when that rake member is disposed in a setting that is appropriate to employment of the machine as a tedder. Under these circumstances, the four rake members overlap one another to some extent as shown in FIGS. 1 and 10 of the drawings, the four rake members being so arranged around their respective axes of rotation that their tine groups 20 intermesh with one another so as substantially to avoid the overlapping rake members fouling each other. The four rake members 7, 8, 14 and 15 of the machine can be adjusted to positions which are appropriate for employment of the whole machine as a swath forming or windrowing machine and, under these circumstances, each rake member has an overall diameter of substantially 1.5 meters, the circles which are traced by the tips of the tines of the groups 20 (as shown in broken lines in several of the figures of the drawings) just about touching one another as seen in FIG. 1 and the total working width of the machine remaining at substantially 6 meters.

Figure 6:
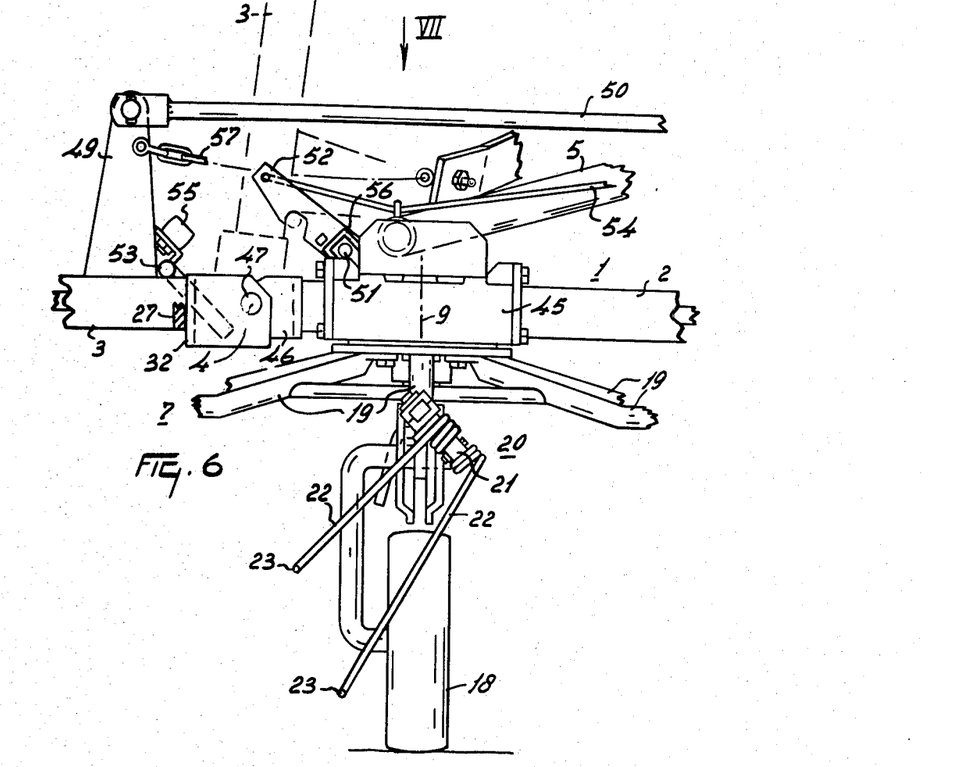
FIG. 6 is a part-sectional rear elevation, to an enlarged scale, as seen along the line VI—VI in FIG. 1.

Each of the four rake members 7, 8, 14 and 15 comprises a plurality (for example, 8) of spokes 19 which spokes extend radially from the axis of rotation of the rake member concerned (at least when that rake member is viewed in a direction parallel to its axis of rotation) at regular angular intervals around said axis of rotation. The inner ends of the spokes 19 are secured to a corresponding hub which is rotatably drivable from the respective gear box, each spoke 19 carrying one of the aforementioned tine groups 20 at substantially its radially outermost end. Each tine group 20 (FIG. 6) is formed from a single length of spring steel wire or rod and is adjustable in position having regard to whether the machine is to perform a tedding or swath-forming action. Each tine group 20 has an obliquely disposed holder 21 around which, at opposite sides of a fastening bolt, are disposed two helical coils forming parts of two of the integral tines of the group 20 concerned. Each oblique holder 21 is inclined downwardly from the outermost end of the corresponding spoke 19 at an angle of substantially 45 degrees to both the horizontal and the vertical, the direction of inclination being forwardly with respect to the intended direction of operative rotation B or C (FIG. 1) of the rake member 7, 8, 14, or 15 concerned. The tine group 20 which is illustrated in FIG. 6 of the drawings is one of the tine groups of the rake member 7 which is intended for operative rotation in the direction B that is shown in FIG. 1. The inner ends of the two coils which have just been mentioned are integrally connected to one another by a bend (not visible in the drawings) which bend is clamped to the holder 21 concerned by the aforementioned fastening bolt. The relatively remote ends of the two helical coils merge into tine connecting portions 22 that are substantially straight and that, as seen in plan view, preferably extend substantially tangentially rearwards from the corresponding holder 21 with respect to a circle centered up on the axis of rotation 9, 10, 16 or 17 concerned. The lowermost ends of the tine connecting portions 22 are integrally connected to working portions 23 of the tines, each working portion 23 being directed outwardly and having its longitudinal axis contained in a plane that is perpendicular to the respective axis of rotation 9, 10, 16 or 17. The connecting portions 22 and working portions 23 of the two tines of each group 20 are located substantially one above the other.

Each holder 21 is pivotally mounted, for the purpose of adjustment of the corresponding group 20, and means which it is not necessary to illustrate nor to describe in detail for the purposes of the present invention is provided by which each holder can be retained in a position in which the corresponding group 20 is suitably disposed for the tedding of hay or other crop or in a position in which it is suitably disposed for forming displaced hay or other crop into a swath or windrow. When one of the tine groups 20 is suitably disposed for a tedding operation, its working portions 23 extend substantially radially outwards with respect to the axis of rotation concerned whereas, when said group 20 is suitably disposed for a swath forming operation, the working portions 23 of its tines are disposed substantially wholly behind radial lines which intersect the junctions between the connecting portions 22 of the tines and the working portions 23 of the same tines. In the latter position, each connecting portion 22 extends (as seen in a direction parallel to the corresponding axis of rotation) substantially tangentially rearwards from its associated helical coil relative to a circle centered upon the axis of rotation 9, 10, 16 or 17 and with respect to the direction of rotation B or C concerned.

A hay-making machine in accordance with the invention may employ rotary rake members having an alternative tine formation which is not illustrated in the accompanying drawings. These alternative tines have working portions which project outwardly with respect to the corresponding axis of rotation in planes which are perpendicular or substantially perpendicular to that axis. However, said alternative tines are pivotable in groups about axes which, when viewed in a direction parallel to the corresponding axis of rotation, are substantially tangential to a circle centered upon that axis, said circle having a relatively small radius of between substantially 10 and substantially 25 centimeters. With this construction, the rigid part of each rake member is relatively small in relation to the overall height of that rake member which may advantageously be between substantially 70 and substantially 75 centimeters. In this alternative construction which is not illustrated, the grouped tines are pivotable, during operation, about the pivot axes for the respective groups and are also upwardly tiltable into an inoperative transport position.

It will be noted from FIG. 1 of the drawings that the two rake members 7 and 14 at one side of the machine are operatively rotatable in the opposite directions B as are the two rake members 8 and 15 at the opposite side of the machine, the latter members 8 and 15 being operatively rotatable in the opposite directions C.

Each of the two carriers 3 has releasably connected to it two crop guide members that are intended for use in forming hay or other crop displaced by the rake members 7, 8, 14 and 15 into swaths or windrows. When viewed in the intended direction of operative travel A of the machine (i.e. as seen in FIG. 10 of the drawings), a first guide member 24 is disposed between the rake members 8 and 15 and, considered in the same direction, is close to both the corresponding substantially horizontal pivotal axis 4 and to the substantially vertical axis of rotation 10. An extension arm 25 whose rearmost end is connected to the top and front of the first guide member 24 couples that guide member 24 to the corresponding carrier 3. The leading end of the extension arm 25 constitutes a fastening portion of the guide member 24 and is freely pivotable upwardly and downwardly above a fastening member in the form of a pin 26 whose axis extends parallel to that of the associated carrier 3 at a location close to that carrier 3. The pin 26 is rigidly secured to a supporting plate 27 whose front is welded to the carrier 3 under discussion, said plate 27 being vertically disposed when the carrier 3 is horizontally disposed. The pin 26 projects from both sides of the supporting plate 27 and the extension arm 25 cooperates pivotally with that end of the pin 26 which is closest to the center of the machine (see FIG. 2). The first guide member 24 is, of course, freely pivotable about the pin 26 with its extension arm 25. A tongue 28 of L-shaped configuration (FIGS. 2 and 4) has one of its limbs secured to the extension arm 25 in such a way that the other limb thereof embraces a curved rear edge region of the supporting plate 27. Said rear edge region is formed, at its lower end, with a rearwardly projecting lug (FIG. 4) which lug blocks downward movement of the first mentioned limb of the tongue 28 about the pin 26 beyond a position in which said limb abuts against the upper edge of the lug 29. The cooperation between the tongue 28 and the lug 29 naturally also defines the downward end of the arc of angular movement of the first guide member 24 and its extension arm 25 which is possible about the pin 26.

Figures 2, 3:
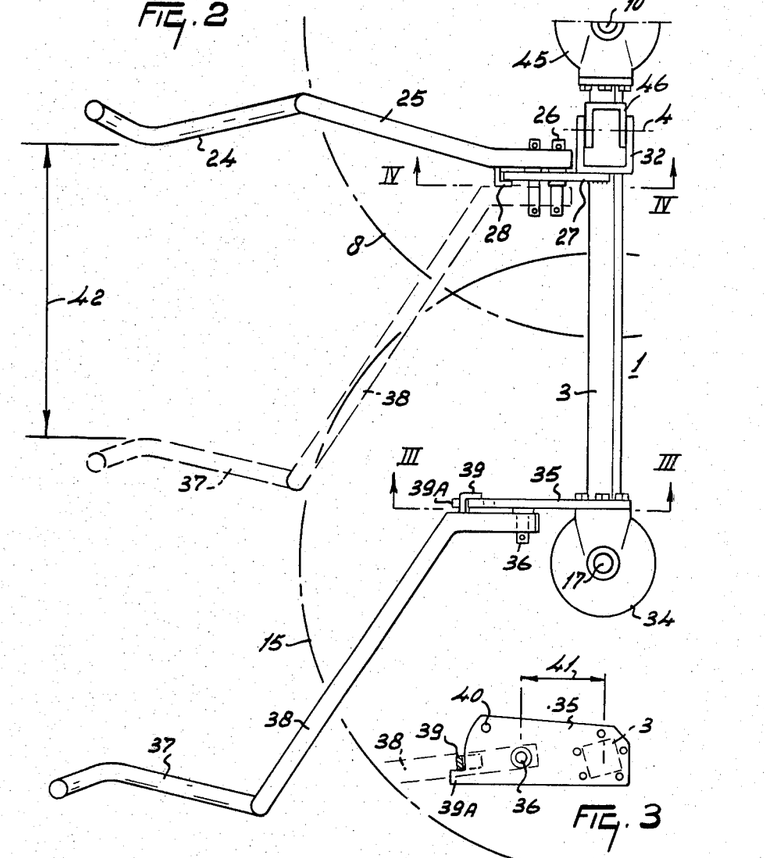
FIG. 2 is a plan view, to an enlarged scale, showing parts at the foot of FIG. 1 in greater detail but with the omission of two rotary rake members of the machine for the sake of clarity.
FIG. 3 is a part-sectional elevation, to an enlarged scale, taken along the line III—III in FIG. 2.
Figure 4:
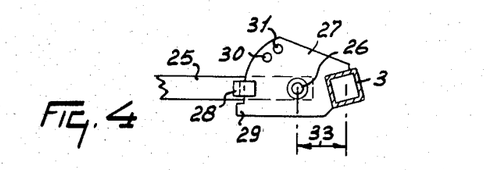
FIG. 4 is a part-sectional elevation taken along the line IV—IV in FIG. 2, FIG. 5 corresponds in scale and location to FIG. 2 but illustrates an alternative embodiment.

The supporting plate 27 is formed, towards the upper end of its curved rearmost edge, with two holes 30 and 31 (FIG. 4) which holes are equidistant from the longitudinal axis of the pin 26 about which the drive member 24 and its extension arm 25 are upwardly and downwardly pivotable. A hole (not visible) is also formed through the extension arm 25 at the same distance from the axis of the pin 26 as are both of the holes 30 and 31 and, accordingly, the hole in the extension arm 25 can be brought into register with either the hole 30 or the hole 31 by turning the guide member 24 and arm 25 upwardly about the pin 26 to an appropriate extent. A removable locking pin which appears alongside the pin 26 in the plan view of FIG. 2 can be entered through the hole in the extension arm 25 and either the hole 30 or the hole 31 to retain said arm 25 and the first guide member 24 in a corresponding angular setting about the axis of the pin 26. The locking pin which has just been mentioned is also usable to maintain an outer guide member 37 and an extension arm 38 thereof in a similar angular position, as will be discussed below, because said locking pin, like the pivot pin 26, projects from both sides of the supporting plate 27. It will be appreciated that, when the locking pin is cooperating with the extension arm 25 of the guide member 24, that guide member is maintained at a considerably higher level above the ground surface than it is when, as shown in FIG. 4, the locking pin is not in use. It can be seen in FIG. 2 of the drawings that the extension arm 25 is inclined rearwardly from its pivotal connection to the supporting plate 27 at a relatively small angle to the direction A, the direction of inclination being such that the rear end of the extension arm 25 is nearer to the center of the machine than is its leading end. The arrangement is, in fact, such that, when viewed as projected onto a horizontal plane (i.e. as seen in FIG. 2), the first guide member 24 is substantially in register, in the direction A, with the pivotal axis 4 of the corresponding carrier 3. The leading end of the supporting plate 27 that is welded to the carrier 3 concerned, abuts against the base of a fork 32 which fork is mounted at one end of the corresponding carrier 3 so as partially to embrace the respective universal joint 13 (see FIG. 7) and pivotally to embrace a second and narrower fork 46 which is located at the end of the associated half of the main frame beam 2. It is noted that, with respect to the intended direction of operative travel A, the pivotal axis of the pin 26 is located at a horizontal distance 33 (FIG. 4) behind the longitudinal axis of the corresponding carrier 3.

The aforementioned gear box by which drive is transmitted to the rake member 15 is designated 34 in the drawings and a supporting plate 35, which is somewhat similar to the supporting plate 27 except in size, has its leading end (with respect to the direction A) bolted to the side of said gear box 34 which is closest to the center of the machine. A pivot pin 36, which will be substantially horizontally disposed when the corresponding carrier 3 is substantially horizontal, is carried rigidly by the supporting plate 35 and projects only to that side of said plate 35 which is remote from the center of the machine. The longitudinal axis of the pivot pin 36 constitutes a pivotal axis for the aforementioned extension arm 38 which carries the outer guide member 37. Once again, the leading end of the extension arm 38 constitutes a fastening portion of that extension arm and thus of the outer guide member 37. As in the case of the parts 24 and 25, it is the top and front (with respect to the direction A) of the outer guide member 37 which is fixedly secured to the rear end of the extension arm 38. The leading end (fastening portion) of the extension arm 38 carries an L-shaped tongue 39 which is arranged in a similar manner to the tongue 28 in embracing relationship with a curved rear edge of the supporting plate 35. The lowermost end of said curved rear edge is in the form of a rearwardly projecting lug 39A which lug is in the path of downward movement of the tongue 39 thus limiting the downward pivotability of the outer guide member 37 and its extension arm 38 which are possible about the axis defined by the pivot pin 36. A hole 40 is formed through the supporting plate 35 close to the upper end of its rearmost edge and a hole (not visible) is formed through the extension arm 38 at the same distance from the longitudinal axis of the pin 36 as is the hole 40. Accordingly, but turning the outer guide member 37 and its extension arm 38 upwardly to an appropriate extent, the hole in the arm 38 can be brought into register with the hole 40 and a locking pin (not shown) can be entered through the aligned holes to retain the outer guide member 37 in a raised position in which it is well clear of the ground surface. However, when the locking pin that has just been mentioned is not in use, the outer guide member 37 and its extension arm 38 can turn freely upwardly and downwardly about the pin 36. The longitudinal axis of the pivot pin 36 is spaced rearwardly from the longitudinal axis of the corresponding carrier 3 by a horizontal distance 41 (FIG. 3) which is greater than the aforementioned horizontal distance 33

(FIG. 4). However, the pins 26 and 36 are in parallel relationship with one another.

The leading fastening portion of the extension arm 38 is in parallel relationship with the closely adjacent supporting plate 35 and thus, as seen in FIGS. 1 and 2 of the drawings, in perpendicular relationship with the longitudinal axis of the associated carrier 3. However, again as seen in the plan view of FIG. 1 or FIG. 2, the remainder of the extension arm is inclined outwardly and rearwardly with respect to the direction A from said fastening portion at an angle of between substantially 50° and substantially 60° to said direction A. Thus, as viewed from the rear in the direction A (FIG. 10) the outer guide member 37 is spaced laterally by a significant distance from the leading fastening portion of its extension arm 38 in contradiction to the first guide member 24 which, considered in the same way, is spaced laterally from the leading fastening portion of its extension arm 25 by only a very small distance. It is noted that, in FIG. 10, both the first guide member 24 under consideration and a first guide member 24 which is arranged symmetrically at the opposite side of the center of the machine are shown in upwardly raised inoperative transport positions. If desired, the outer guide member 37 can be removed from the position shown in full lines in FIG. 2 of the drawings to the position that is shown in broken lines in the same Figure. This is achieved merely by temporarily removing a split pin, safety pin or the like from the tip of the pivot pin 36 and subsequently turning the outer guide member 37 and its extension arm 38 until the tongue 39 moves upwardly beyond the upper end of the curved rear edge of the plate 35. The assemblies 37, 38 can then be withdrawn from the pivot pin 36 and be transferred to engagement with the end of the pin 26 which projects from the side of the supporting plate 27 that is remote from the center of the machine. The engagement with the pin 26 is, of course, carried out with the fastening portion of the extension arm 38 in such a raised position that the lug 39 will not embrace the rear curved edge of the supporting plate 27. Once this engagement has been made, the outer guide member 37 and its extension arm 38 can be turned downwardly about the pin 26 into substantially the broken line position thereof that is show in FIG. 2, the transfer being completed by installing a split pin, safety pin or the like at the end of the engaged portion of the pin 26. Under these circumstances, the rear ends of the two guide members 24 and 37 are both disposed at the same distance, measured in the direction A, behind the associated carrier 3. It can be seen in FIG. 2 of the drawings that, when the outer guide member 37 is connected to the pivot pin 36 by its extension arm 38, the rear end of that outer guide member 37 is located a little further behind the associated carrier 3, measured in the direction A, than is the rear end of the first guide member 24 as measured in the same direction. When the outer guide member 37 occupies its broken line position as shown in FIG. 2 of the drawings, the minimum distance 42 between the guide members 24 and 37 defines the width of a swath or windrow of hay or other crop that is to be formed by the machine when it is in use.

Figure 5:
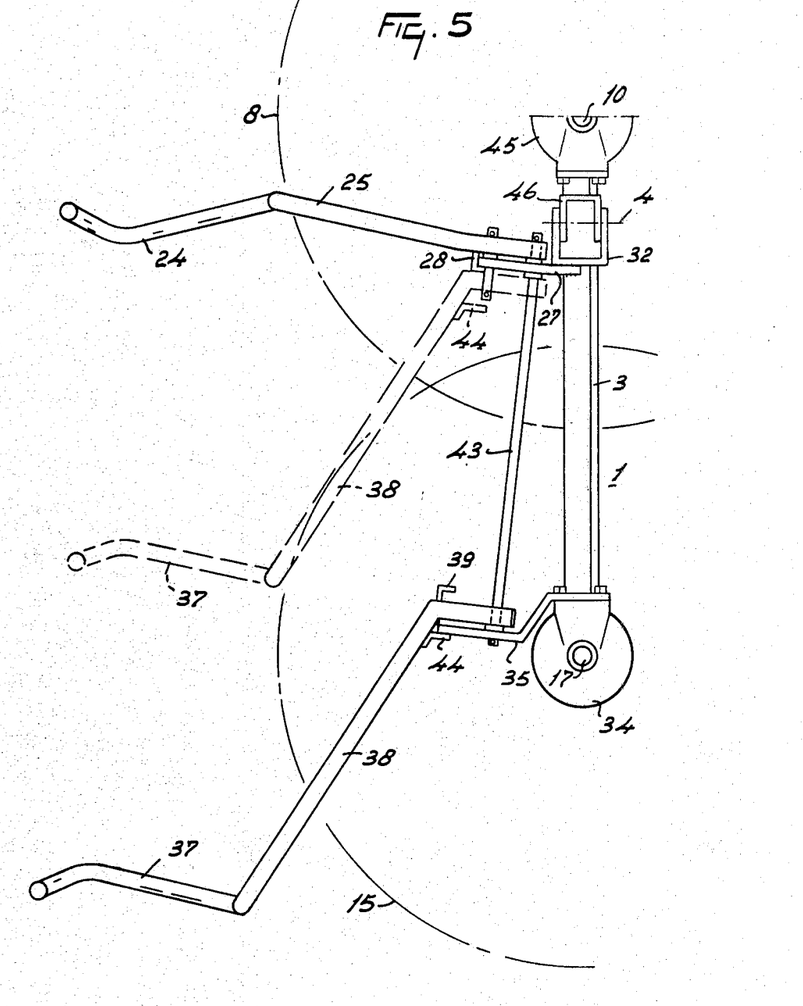

FIG. 5 of the drawings illustrates an alternative way in which the outer guide member 37 can be displaced from one operative position to another. Although, in the embodiment of FIG. 5, the supporting plates 27 and 35 are a little different in shape to the shapes which are illustrated in FIGS. 2, 3 and 4, they are nevertheless designated by the same references as are used in the formed Figures since they perform substantially the same function. In the embodiment of FIG. 5, a straight shaft 43 extends between the two supporting plates 27 and 35 and has substantially its opposite ends secured to those two plates. In a full line position of the parts 37 and 38 which is shown in FIG. 5, the leading fastening portion of the arm 38 is located at that side of the supporting plate 35 which is closest to the center of the machine in contradiction to the arrangement of FIGS. 2 and 3 where it is located at the side of said plate 35 which is remote from the center of the machine. In the embodiment of FIG. 5, the extension arm 38 carries a second obliquely disposed tongue 44, said tongue 44, when the parts 37 and 38 are in the full line position shown in FIG. 5, abutting against the supporting plate 35 and thus preventing the outer guide member 37 from moving toward the first guide member 24 by displacement of the fastening portion of its extension arm 38 along the shaft 43. Displacement of the outer guide member 37 from its full line position in FIG. 5 to its broken line position in the same Figure is achieved merely by turning said guide member 37 and its extension arm 38 upwardly about the axis of the shaft 43 until the tongue 44 no longer embraces the supporting plate 35. The whole assembly 37, 38, 39, 44 can then be slid lengthwise along the rod 43 until the tongue 39 can be engaged around the rear curved edge of the supporting plate 27 at a location which is preferably above that of the tongue 28 which corresponds to the first guide member 24 and its extension arm 25.

The guide members 24 and 37 are shown only diagrammatically in the drawings and may comprise assemblies of resilient rods or other parts designed to function as swath boards. It can be seen from FIGS. 1 and 10 of the drawings that the whole machine is substantially symmetrical about a vertical plane which is parallel to the direction A and that contains the center of the gear box 11 and thus it will be appreciated that there are two guide members 24 and 37 at the opposite side of said plane from the members 24 and 37 of FIGS. 2 to 5 of the drawings, the arrangement of these further two guide members 24 and 37 being symmetrically identical to that which has been described above.

The earlier mentioned gear box from which drive is transmitted to the rotary rake member 7 is designated 45 in the drawings and the aforementioned second fork 46 is located very close to this gear box 45 at the side thereof which is remote from the center of the machine. The larger and smaller forks 32 and 46 are pivotally interconnected by a pair of aligned trunnion pins 47 which physically defined the corresponding pivotal axis 4, the construction and arrangement at the opposite side of the center of the machine being symmetrically identical. It will be apparent that each carrier 3 is turnable upwardly and downwardly about the axis 4 which is defined by the corresponding pair of trunnion pins 47 (FIGS. 6 and 7). Moreover, as can be seen best in FIG. 7 of the drawings and as previously mentioned above, the larger fork 32 embraces that half 48 of the corresponding universal joint 13 which is remote from the center of the machine whereas the smaller fork 46 embraces the complementary half of the same universal joint 13. The center of the universal joint 13 is intersected by the associated pivotal axis 4 and the whole joint 13 is surrounded by the two cooperating forks 32 and 46.

It can be seen in FIGS. 1, 6 and 7 of the drawings that a support 49 projects upwardly from the top of each carrier 3 at a location close to the respective pivotal axis 4. The upper ends of the two supports 49 are pivotally coupled to the free end of the piston rod, and to the base of the cylinder, respectively, of a hydraulic piston and cylinder assembly 50 which assembly 50 extends principally above the main frame beam 2 in substantially parallel relationship therewith. The hydraulic piston and cylinder assembly 50 is so constructed that, upon applying hydraulic pressure thereto from the hydraulic system of the towing agricultural tractor or other operating vehicle, the piston will be withdrawn into the cylinder and this will cause both of the carriers 3 to be turned upwardly about the corresponding axes 4 into substantially the position which is shown in broken lines for one of them in FIGS. 6, 8, 9 and 10 of the drawings.

Each of the two symmetrically identical gear boxes 45 supports, at the side thereof which is remote from the center of the machine, a corresponding pivot pin 51 (FIGS. 6 and 7) which defines an axis that is substantially horizontally parallel to the direction A and that is spaced by only a short distance from the corresponding substantially, but not exactly, vertical axis of rotation 9. Each pivot pin 51 has a corresponding latch plate 52 turnably mounted thereon, each latch plate having a recess in its lower edge which will cooperate retainingly with a latch pin 53 when the neighbouring carrier 3 is turned upwardly and inwardly about its pivotal axis 4. Each latch pin 53 is fastened to the respective carrier 3 at a location close to the base of the corresponding support 49. The end of each latch plate 52 which is remote from the corresponding pivot pin 51 has one end of a flexible rope or cable 54 connected to it, the two ropes or cables 54 extending from said latch plates 52, via guide eyes, towards and through the coupling member or trestle 6 to have their leading ends (not shown) accessible to the driver of the agricultural tractor or other vehicle which moves and operates the machine. Each carrier 3 is provided, on a portion of the corresponding latch pin 53, with a rubber or other resilient stop 55 which, when the carrier 3 concerned is located in its upwardly tilted inoperative transport position (as shown in broken lines in some Figures of the drawings) bears firmly against a bracket 56 that is arranged around one end of the pivot pin 51 for the latch plate 52 concerned. When the two carriers 3 and the rake members 14 and 15 which they support are to be turned upwardly and inwardly into an inoperative transport position from a working position, the cylinder of the assembly 50 is subject to pressure from the hydraulic system of the agricultural tractor or other vehicle which operates the machine and this causes the piston of the assembly 50 to be withdrawn into the cooperating cylinder. As the two carriers 3 turn upwardly and inwardly about their respective axes 4, the two latch pins 53 slide along the lower edges of the two latch plates 52 until said pins 53 engage in the recesses that are formed in the lower edges of the latch plates 52. The various parts are so dimensioned that the latch pins 53 become lodged in the recesses in the latch plates 52 at a time when the rubber or other resilient stops 55 are somewhat compressed against the brackets 56 so that, when the piston and cylinder assembly 50 is no longer subject to hydraulic pressure, the compressed stops 55 will tend firmly to retain the latch pins 53 in the recesses in the latch plates 52. This prevents accidental disengagement of the pins 53 from the latch plates 52 as a result of, purely for example, jolting of the machine as it is transported over uneven ground or any rough track or road. When it is desired to return the two carriers 3 from their upwardly tilted inoperative position to a substantially horizontal working position, the hydraulic piston and cylinder assembly 50 is first subject to pressure for a short time to urge the two resilient stops 55 very firmly into engagement with the two brackets 56, the two ropes or cables 54 then being pulled by the person occupying the driving seat of the agricultural tractor or other vehicle to which the machine is connected so that the two latch plates 52 are turned upwardly about the two pivot pins 51 to bring them out of latching engagement with the pins 53. The two carriers 3 can then be turned downwardly about the respective axes 4 into substantially the working position which is shown in FIG. 1 of the drawings and in full lines in FIG. 10 thereof. If the hydraulic piston and cylinder assembly 50 is a double-acting assembly, as is preferred, this downward tilting movement of the two carriers 3 can be initiated and controlled from the cooperating tractor or other vehicle or, in the event of the provision of a single-acting assembly 50, the downward tilting of the two carriers 3 can be effected manually. In order to ensure that the pressure which is exerted by the assembly 50 cannot be sufficient to cause damage, it is desirable to include in the hydraulic ducts which feed that assembly an excess pressure relief valve adjusted to an opening valve which will prevent the displacing force exerted by the assembly 50 from ever reaching a dangerous magnitude.

A chain 57 or some other flexible but inextensible member, such as a steel cable, is anchored to each support 49 at a location which is close to the top thereof when each carrier 3 occupies its substantially horizontal working position. The ends of the two chains 57 or the like which are remote from corresponding supports 49 are fastened to adjacent portions of the tie structure 5, each chain 57 or the like having such a length that it limits the downward movement of the corresponding carrier 3 about its axis 4 which is possible. Preferably, the length of each chain 57 or the like is such that each carrier 3 cannot turn downwardly about the corresponding axis 4 beyond a position in which its longitudinal axis is downwardly inclined to a horizontal plane containing the longitudinal axis of the main frame beam 2 at a maximum angle of between substantially 7° and substantially 10°.

Figure 8:
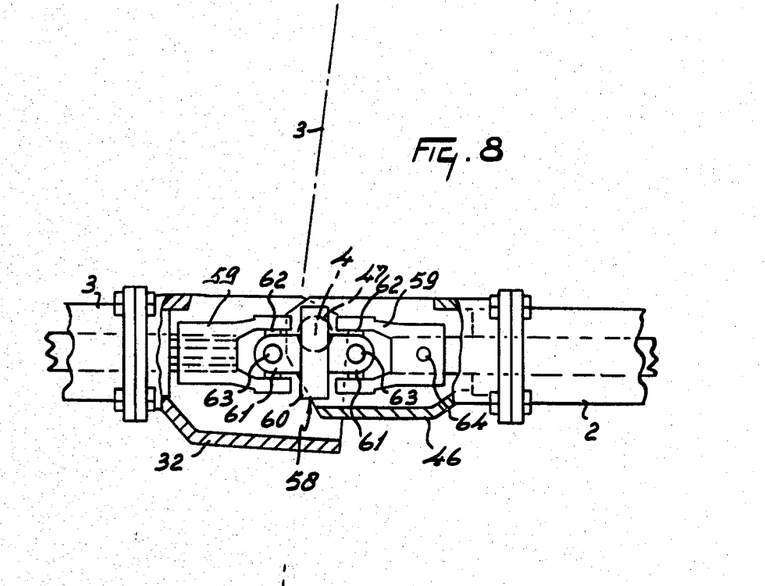
FIG. 8 is a part-sectional elevation, to an enlarged scale, taken along the line VIII—VIII in FIG. 7 but illustrating an alternative construction in accordance with the invention.

FIG. 8 of the drawings illustrates an alternative construction of the drive coupling between the shaft which extends axially through the hollow main frame beam 2 and the shaft which extends axially through one of the two carriers 3. The arrangement at the opposite end of the carrier 2 from that which is illustrated in FIG. 8 of the drawings will, of course, be substantially symmetrically identical. In this construction, the universal joint 13 is replaced by a double universal coupling 58. A fork 59 is formed with a socket which is arranged around the end of the driving shaft 2 which projects axially from the hollow main frame beam 2 and is maintained in substantially rigid engagement with that end by a transverse pin 64. The two limbs of the fork 59 are pivotally connected to the two limbs of a second fork 61 by a cruciform member that comprises co-planar but relatively perpendicular pivots 62 and 63, the pivots 62 being engaged with the limbs of the fork 59 and the pivots 63 being engaged with the limbs of the second fork 61. The second fork 61 forms part of an intermediate member 60 and it will be seen from FIG. 8 of the drawings that the second fork 61 is duplicated at the opposite (left) side of the intermediate member 60 to establish the pivotal collection with the neighbouring end of the shaft which extends axially through the carrier 3 concerned in a substantially symmetrically identical way to that which has just been described for the connection to the driving shaft which extends axially through the main frame beam 2. The only significant difference between the connections to the two driving shafts is that the right hand fork 59 as seen in FIG. 8 of the drawings is rigidly connected to the driving shaft in the main frame beam 2 by the pin 64, while the socket or sleeve of the left hand fork 59 as seen in the same Figure is internally splined to cooperate with external splines on the end of the shaft that extends axially through the carrier 3 concerned. Thus, this left hand (in FIG. 8) fork 59 can move axially relative to the cooperating shaft but is fixed rotationally relative thereto. The distances between the pivots 62 and 63 at one side of the intermediate member 60 and the center of that member 60 are the same as the distances between the pivots 62 and 63 at the opposite side of said member 60 and the center thereof. The reason for the use of the double universal couplings 58 will be explained below.

It will be apparent from FIG. 8 of the drawings that the substantially horizontal pivotal axis 4 whose position is shown in that Figure does not intersect the longitudinal axis of the driving shaft in the main frame beam 2 but is spaced a short but significant distance about that axis. The perpendicular spacing between the pivotal axis 4 and the longitudinal axis of the driving shaft in the main frame beam 2 has a magnitude which is substantially equal to half the perpendicular distance between the pivotal axes which are defined by the two pivots 63 of the corresponding double universal coupling 58.

Figure 9:
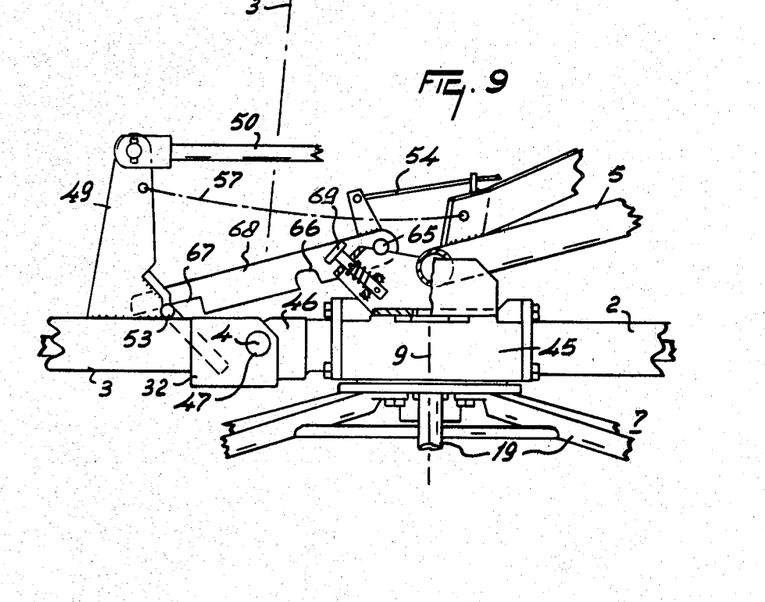
FIG. 9 is a part-sectional rear elevation corresponding in scale and location to the view of FIG. 6 but illustrates an alternative construction.

FIG. 9 of the drawings illustrates an alternative form, as compared with what is illustrated in FIG. 7, of the means by which each carrier 3 can be firmly retained in its upwardly and inwardly tilted inoperative transport position. The means which is illustrated in FIG. 9 of the drawings has two principal functions and comprises a latch plate 68 which is turnable about a pivot pin 65 that extends substantially horizontally parallel to the direction A, said pivot pin 65 being indirectly rigidly mounted at the top of the corresponding gear box 45. The lower edge of the latch plate 68 is arranged to cooperate with the previously described latch pin 53 and is formed, to this end, with a recess 66. The recess 66 cooperates with the latch pin 53 when the carrier 3 concerned has been turned upwardly and inwardly about its pivotal axis 4 into the inoperative transport position that is shown in broken lines in FIG. 10 of the drawings. It will be noted that, in the embodiment of FIG. 9, the resilient stop 55 of FIGS. 6 and 7 of the drawings is not employed and is replaced by a plain abutment plate. This plain abutment plate cooperates, in the upwardly tilted inoperative position of the carrier 3 concerned, with a spring-loaded stop 69 for the same purpose as has been described above in connection with the cooperation of the resilient stop 55 and bracket 56. It will be seen from FIG. 9 that the latch plate 68 is of greater length than is the previously described latch plate 52 and that the lower edge thereof is formed, at the end thereof which is remote from the corresponding pivot pin 65, with a second right-angled recess 67 in which lies the respective latch pin 53 when the carrier 3 concerned is in its lowered operative position. The arrangement is, in fact, such that the latch pin 53, which is rigid with the corresponding carrier 3, can move freely along the second recess 67 up to a point at which said carrier 3 is tilted upwardly about its pivotal axis 4 at an angle of, preferably, substantially 20° to a horizontal plane containing the longitudinal axis of the main frame 2. The latch pin 53 then meets the end of the right-angled recess 67 so that said carrier 3 cannot be turned upwardly any further about its axis 4 without the intervention of the operator of the tractor or other cooperating vehicle to lift the latch plate 68 about its pivot pin 65 by pulling upon the corresponding rope or cable 54. Thus the provision of the second right-angled recess 67 prevents excessive upward turning movement of the corresponding carrier 3 about its pivotal axis 4 during operation while the chain 57 or the like prevents excessive downward turning movement as discussed above in connection with FIGS. 6 and 7 of the drawings. It is noted that the excess pressure relief valve which is incorporated in the ducts to the hydraulic piston and cylinder assembly 50 will prevent damage in the event that said assembly should be operated to tilt the two carriers 3 upwardly without first lifting the two latch plates 68 to positions in which the latch pins 53 will not come into engagement with the inner ends of the corresponding second recesses 67.

In the use of the haymaking machine which has been described, its coupling member or trestle 6 is connected to the three-point lifting device or hitch at the rear of an agricultural tractor or other operating vehicle and the rotary input shaft 12 of the gear box 11 is placed in driven connection with the rear power take-off shaft of the same tractor or other operating vehicle by way of an intermediate telescopic transmission shaft, which is of a construction that is known per se, having universal joints at its opposite ends. When the machine is in use, its two neighbouring rake members 7 and 14 will rotate in the relatively opposite directions B (FIG. 1) while the other two immediately neighbouring rake members 8 and 15 will revolve in the opposite directions C that are shown in FIG. 1 of the drawings. The ground wheels 18 support the frame of the in such a way that the two outer rake members 14 and 15 can turn upwardly and downwardly relative to the two central rake members 7 and 8 about the corresponding pivotal axes 4 so as to match any undulations in the surface of the ground that they may meet with during operative progress in the direction A. It is noted particularly that it is by no means essential that the main frame beam 2 and carriers 3 should extend substantially horizontally perpendicular to the direction A when the machine of which they form part is in use. A hay-making machine in accordance with the invention may have the main frame beam 2 and the carriers 3 in significantly oblique relationship, as seen in plan view, with the direction A.

When the machine is to function as a tedder, it is disposed substantially as shows in FIG. 1 of the drawings which position corresponds to locating the inner guide members 24 and outer guide members 37 as shown in full lines in FIG. 2 or FIG. 5. The two first guide members 24 are fixed in place relative to their supporting plates 27, and thus relative to the respective carriers 3, by turning them upwardly through short distances, together with the corresponding extension arms 25, about the respective pins 26 until the previously discussed locking pins can be entered through the holes 31 and through the then registering holes (not visible) in the fastening portions of the extension arms 25. This retains the first guide members 24 at a significant distance above ground level during tedding of the hay or other crop. The outer guide members 37 are not locked in position during a tedding operation and remain upwardly and downwardly turnable above the corresponding pivot pins 36 except that, of course, downward movements about those pins 36 are limited by cooperation between the tongues 39 and the lugs 39A. Accordingly, the lower surfaces of the first guide members 37, which are strengthened for this purpose, slide over the ground surface in the direction A. The tongues 39 do not normally come into contact with the lugs 39A until the whole machine is lifted clear of contact with the ground by raising the three-point lifting device or hitch of the associated agricultural tractor or other operating vehicle. The contra-rotating rake members 7, 14 and 8, 15 displace hay or other cut crop lying up on the ground by way of the working portions 23 of the tines of their tine groups 20, said hay or other crop being principally displaced rearwardly through the regions of overlap between the pairs of rake members 7, 14 and 8, 15 (see FIG. 1). The hay or other crop is delivered rearwardly from the rake members in a well diffused condition which is conducive to the subsequent natural drying of the crop by sun and wind. When disposed in the positions which have just been described, the first guide members 24 are located above the displaced hay or other crop and do not influence its direction of rearward ejection to any significant extent, if at all. However, some quantities of the displaced hay or other crop will strike the outer guide members 37 which are sliding forwardly over the ground surface in the direction A so that said guide members will define the outer limits of the windrow of tedded crop that is formed by the machine, very little displaced crop escaping beyond these quite sharply defined outward limits.

As previously discussed, the two outer guide members 37 are located a little further rearwardly, with respect of the direction A, then are the two first guide members 24 when the latter guide members are disposed in their operative positions and the machine is arranged to form the displaced hay or other crop into swaths.

This is because the distance 41 (FIG. 3) is larger than the distance 33 (FIG. 4) and the result is that hay or other crop which is displaced outwardly to only a small extent can still be influenced as to where it falls to the ground by the rear ends of the outer guide members 37. When the machine is arranged to perform a tedding operation, it is not necessary for the fronts of the outer guide members 37 to be closely adjacent to rear regions of the circular paths which are traced by the tips of the tines of the groups 20 of the rake members 14 and 15, these circular paths being shown in broken lines in several Figures of the drawings.

When the machine is disposed for the formation of swaths of hay or other crop, the tine groups 20 of the various rake members are set in appropriate positions in which said tines are swept back rearwardly with respect to the corresponding directions of rotation B and C. Under these circumstances, the outer guide members 37 and their extension arms 38 are displaced from the positions shown in full lines in either FIG. 2 or FIG. 5 of the drawings to the positions which are shown in broken lines in one of those Figures. It will be remembered that it is only necessary to turn each outer guide member 37 and its extension arm 38 upwardly about the pivot pin 36 so far that the tongue 39 concerned no longer embraces the curved rear edge of the associated supporting plate 35. Re-engagement with the outer end of the respective pivot pin 26 is effected in the reverse manner.

The two guide members 24 and 37 and their respective extension arms 25 and 38 are freely pivotable upwardly and downwardly about the opposite ends of the same pivot pin 26 for swath-forming purposes so that lower portions of both guide members 24 and 37 can slide forwardly over the ground surface in the direction A, moving upwardly and downwardly, as may be required, to match any undulations in the ground which may be met with. The tongue 28 is spaced above the lug 29 under these operational circumstances and the tongue 39 is spaced above the tongue 28 so that very rarely, if ever, do said tongues 28 and 39 come into interfering contact with one another. However, when the whole machine is lifted upwardly by the three-point lifting device or hitch of the co-operating agricultural tractor or other vehicle, the tongue 28 moves downwardly into contact with the lug 29 and the tongue 39 moves downwardly into contact with the tongue 28 so that, under these circumstances, both guide members 24 and 37 are prevented from turning too far downwardly. It should, perhaps, be mentioned again that the construction and arrangement of the parts at the opposite side of the machine which correspond to the parts that can be seen in FIGS. 2, 3 and 4 or in FIG. 5 of the drawings are symmetrically identical to the construction and arrangement which is illustrated in those Figures.

When the machine is arranged for the formation of swaths, the rear ends of its guide members 24 and 37 are all at substantially the same distance behind the main frame beam 2 and carriers 3 with respect to the direction A because all four of them are connected to the two coaxial, or at least substantially coplanar, pivot pins 26 and an inspection of either FIG. 2 or FIG. 5 of the drawings will show that, under these circumstances, the front of the illustrated first guide member 24 is very close to the path that is traced by the tips of the tines of the rake member 8 whereas the front of the illustrated outer guide member 37 is very close to the path that is traced by the tips of the tines of the rake member 15. As viewed from the rear in the direction A (FIG. 10), the guide members 24 and 37 are located between the axes of rotation of the associated rake members 8 and 15 (or 7 and 14), the distance between each outer guide member 24 and the axis of rotation of the nearest rake member 7 or 8 being equal, or substantially equal, to the distance between each outer guide member 37 and the axis of rotation of the respectively neighbouring rake member 14 or 15. It should be remembered that FIG. 10 of the drawings shows the outer rake members 37 disposed in a position suitable for a tedding operation rather than for a swath-forming operation of the kind which is at present under discussion. Since the extension arm 38 of each outer guide member 37 includes a relatively long obliquely disposed portion, each distance 42 (FIG. 2) is substantially equal to the desired maximum width of a swath of hay or other crop that is to be formed by the machine. Moreover, as discussed above, when the machine is suitably disposed for a tedding operation, the formation and disposition of the two extension arms 38 means that the two outer guide members 37 define a width for the broad and diffuse windrow of hay or other crop that is produced by the machine that is equal, or substantially equal, to the total working width of the whole machine.

When the construction illustrated in FIG. 5 of the drawings is employed, each outer guide member 37 can readily be displaced from the working position thereof that is illustrated in full lines (tedding position) to the working position thereof that is illustrated in broken lines (swath-forming position) mereby by turning said member 37 and its extension arm 38 upwardly about the corresponding shaft 43 sufficiently far to bring either the tongue 39 or the second obliquely disposed tongue 44 out of retaining engagement with either the supporting plate 27 or the supporting plate 35, subsequently sliding the parts 37 and 38 along the shaft 43 from the no longer required position to the fresh position and finally making retaining engagement with either the supporting plate 27 or the supporting plate 35 by turning downwardly about the shaft 43 until retaining engagement is effected by either the tongue 39 or the second obliquely disposed tongue 44. Once again, when the construction illustrated in FIG. 5 is employed, the outer guide member 37 is disposed in the position that is illustrated in broken lines, the tongue 28 is normally spaced above the lug 29 and the tongue 39 is normally disposed at a significant distance above the tongue 28 so that rarely, if ever, do the tongues make any engagement with one another that would interfere with the upward and downward movements of the corresponding guide members 24 and 37 as those guide members move forwardly in the direction A and match undulations in the surface of the ground over which the lower portions thereof are sliding. It is not necessary, in the embodiment of FIG. 5 of the drawings, to disconnect each outer guide member 37 from the machine when changing from a tedding disposition to a swath-forming disposition or vice versa. Each assembly 37, 38 remains connected to the machine as it is slid lengthwise along the corresponding shaft 43 and, since the longitudinal axis of each shaft 43 is in non-parallel relationship with the longitudinal axis of the corresponding carrier 3 by a few degrees, movement of each assembly 37, 38 along the corresponding shaft 43 also displaces said assembly either forwardly, or rearwardly, in the direction A relative to the remainder of the machine.

In some known constructions, an outer guide member (corresponding to one of the guide members 37 of the present machine) is turnable about a vertical or substantially vertical axis relative to a frame beam (corresponding to the main frame beam 2 and carriers 3 of the present machine) to bring it from a position suitable for limiting the spread of hay or other crop during tedding to a position suitable for the formation of swaths. With such a known construction, the disposition of this outer guide member is changed considerably relative to the intended direction of operative travel (corresponding to the direction A in the present machine) and an inner guide member (corresponding to one of the guide members 24 of the present machine) is also significantly inclined to the direction of operative travel of such a known machine when a swath-forming operation is to be performed. The relatively steep rearward convergence of the or each such pair of guide members when such known machines are arranged to perform swath-forming operations tends to result in clogging of the guide members and the associated rotary rake members with large accumulations of hay or other crop when the crop that is being dealt with is lying densely on the ground. This quite considerable practical disadvantage of known machines is avoided with the constructions which have been described since the fastening portions of the extension arms 38 (which are substantially rigidly connected to the outer guide members 37) are displaceable in position relative to the supporting plates 27 and 35 in a simple manner without any angular movement about a vertical or substantially vertical axis being required. Accordingly, in either the tedding position or the swath-forming position, there is very little, if any, rearward angular convergence between the guide members 24 and 37 or between the two guide members 37 alone. Since it is such convergence that is the principal cause of large accumulations of hay or other crop becoming clogged in the machine, such clogging, during use, is very greatly reduced, if not entirely eliminated. Moreover, with the known construction that has just been briefly discussed, the outer guide members are turned about their vertical or substantially vertical axes of adjustment for tedding purposes into positions in which they extend parallel or substantially parallel to the directions of ejections of hay or other crop from the neighbouring rotary rake members so that, in practice, they have very little effect upon the direction of ejection of the crop which thus falls to the ground in the form of a broad and very diffuse windrow whose opposite edges are indeterminate and very irregular. As discussed above, the outer guide members 37 of the described machine extend substantially parallel to the direction A for tedding purposes so that the broad diffuse windrow which is formed by the machine has relatively sharply defined boundaries. It is noted that a machine in accordance with the invention could be constructed so as to form different swath or windrow widths merely by providing additional supporting plates corresponding to the plates 27 and/or 35. Once again, adjustment of the guide members to different positions would readily be possible without displacing them angularly about vertical or substantially vertical axes.

When the machine is to be reduced in width as much as possible as compared with its working position for inoperative transport purposes, the hydraulic piston and cylinder assembly 50 is subject to pressure from the hydraulic system of the associated tractor or other operating vehicle in such a way as to withdraw the piston into the cylinder thereof, it being noted that an adjustable or other throttle valve is advantageously incorporated in the oil or other hydraulic pressure medium duct to the assembly 50 so as to ensure that the two carriers 3 are not turned upwardly and inwardly about the corresponding axes 4 at too rapid a rate; this avoids any severe joilting which could possibly give rise to damage. It has already been mentioned that an excess pressure relief valve is preferably also incorporated in the oil or other hydraulic pressure medium supply duct so as to avoid the assembly 50 over exerting so high a pressure that any parts of the machine could be damaged thereby.

FIGS. 6 and 7 of the drawings illustrate the use of a substantially conventional universal joint 13 and it is noted that, when the carriers 3 are turned upwardly above the corresponding axes 4 into the positions which are shown in broken lines in FIGS. 6 and 10 of the drawings, the driving shaft that is housed in each carrier 3 will have been turned through more than 90° relative to the driving shaft that is housed inside the main frame beam 2. If, under these circumstances, the driver of the tractor or other operating vehicle mistakenly applies drive to the rotary input shaft 12 of the gearbox 11, severe damage to, or breakage of, the drive transmission in the machine can result because the universal joints 13 will jam because they are not capable of transmitting drive through the steep angles of more than 90° which are enclosed between the longitudinal axes of the shafts which they interconnect. Attempts have been made to avoid the expensive and inconvenient damage which can result from such a mistake by incorporating a slip clutch in the drive between the power take-off shaft of the tractor or other operating vehicle and the rotary input shaft of a gearbox corresponding to the gearbox 11 of the present machine but, for this safeguard to be successful, the slip clutch must be appropriately adjusted failing which breakage or serious damage can still result.

The difficulty which has just been discussed can be entirely avoided by employing two double universal couplings of which one is shown in FIG. 8 of the drawings. With this construction, each half of the double universal coupling need accommodate only marginally in excess of a 45° angular displacement and this is within its capability so that the whole double universal coupling 58 can accommodate the inclination of marginally more than 90° between the longitudinal axis of the driving shaft in the main frame beam 2 and the longitudinal axis of the driving shaft in the illustrated carrier 3. Thus, should drive mistakenly be applied to the rotary input shaft 12 of the gearbox 11 in the inoperative transport position of the machine, jamming will not take place and the rake members 14 and 15 that are supported by the two carriers 3 will both be driven without damage to the transmission. It will be noted from FIG. 8 of the drawings that the illustrated pivotal axis 4 is spaced above a substantially horizontal plane containing the longitudinal axis of the driving shaft in the main frame beam 2. Said pivotal axis 4 is contained in a substantially vertical (as seen in FIG. 8) plane of symmetry of the intermediate member 60 of the double universal coupling 58 and the arrangement is such that the left-hand half (in FIG. 8) of the double universal coupling 58 is not axially displaced relative to the driving shaft in the illustrated carrier 3 as regards the depicted working position and the upwardly tilted inoperative position which is indicated in FIG. 8 by a single broken line. As previously discussed, there will be some axial displacement of the left-hand half of the double universal couple 58 relative to the driving shaft in the carrier 3 during pivotal displacement of said carrier 3 about the axis 4 relative to the main frame beam 2 but such axial displacement will be so small with the pivotal axis 4 positioned as illustrated that the co-operating forks 32 and second forks 46 may have the same, or substantially the same, dimensions as when single universal joints 13 are employed. It is not, of course, essential that the double universal couplings 58 should be effectively located inside the frame 1 and they may be employed in embodiments in which driving and driven shafts are pivotally interconnected at locations which are well clear of frame parts.

In the embodiments that is illustrated in FIG. 9 of the drawings, precautions are taken to ensure that the carriers 3 and their associated rake members 14 and 15 cannot be tilted very far upwardly about the corresponding axes 4, towards the inoperative transport position of the machine, when the machine is in its working position, by accidental or erroneous actuation of the corresponding control lever on the associated agricultural tractor or other operating vehicle. The embodiment of FIG. 9 of the drawings employs the single universal joints 13 and it will therefore be appreciated that such accidental or erroneous actuation of the hydraulic piston and cylinder assembly 50, during operation, could result in serious damage to the drive transmission. However, due to the co-operation of the latch pins 53 with the second recesses 67 in the lower edges of the two latch plates 68, the carriers 3 cannot be tilted upwardly through more than an angle of substantially 20° relative to the main frame beam 2 about their respective axes 4 because additional upward angular displacement is blocked by the latch pins 53 coming into engagement with the ends of the second recesses 67. The single universal joints 13 can readily accommodate angular displacements of this magnitude and it will be remembered that the ducts leading to the assembly 50 incorporate a valve which will prevent said assembly 50 from ever exerting a pressure sufficient to damage the parts with which it cooperates. When the machine of FIG. 9 is to be brought to an inoperative transport position by upward tilting of the two carriers 3 about their respective axes 4 through angles of a little greater than 90°, the drive of the tractor or other operating vehicle must deliberately pull the two ropes or cables 54 to displace the latch plates 68 upwardly about their pivot pins 65 so that the ends of the second recesses 67 will no longer co-operate with the latch pins 53 and limit the upward pivotal movements of the two carriers 3 which are possible. The latch pins 53 will eventually co-operate with the recesses 66 into which they will be urged, when hydraulic pressure is withdrawn from the assembly 50, by the spring-loaded stops 69.

It can be seen from the inoperative transport position of the machine that is shown in broken lines in FIG. 10 of the drawings that the two outer guide members 37 are disposed in "raised" positions in which their extension arms 38 co-operate, by way of locking pins, with the holes 40 (FIG. 3) in the corresponding supporting plates 35. Thus, the two outer guide members 37 are directed towards one another and the outermost parts of the machine, in the inoperative transport position, will be the tires of the two ground wheels 18 which correspond to the rake members 14 and 15. When the machine is brought to its inoperative transport position from its swath-forming working position, rather than from its tedding working position as just described, the extension arms 38 of the outer guide members 37 co-operate by way of locking pins with the holes 31 (FIG. 4) in the supporting plates 27 whereas the extension arms 25 of the first or inner guide members 24 co-operate by way of further locking pins with the holes 30 (FIG. 4) in the same supporting plates 27.

Although certain features of the hay-making machine that have been described and/or that are illustrated in the accompanying drawings will be set forth in the following claims as inventive features, it is emphasised that the invention is not necessarily limited to those features and that it includes within its scope each of the parts of the hay-making machine that have been described, and/or that are illustrated in the accompanying drawings, both individually and in various combinations.

We claim:

1. A haymaking machine comprising a frame and a plurality of rake members rotatably mounted on a beam of said frame, driving means connected to rotate said members, said beam including at least two interconnected parts that are relatively pivotable with respect to one another and said parts being joined with pivot means to comprise a coupling, said driving means including shaft means that forms part of said coupling, said shaft means comprising a double universal joint that joins two shaft segments, said pivot means and joint being located adjacent one another and in general vertical alignment with one another, said parts and segments being angularly displaceable with respect to one another by at least 90° about said pivot means and joint, said shaft means remaining operative to rotate said members during displacement.

2. A haymaking machine as claimed in claim 1, wherein said coupling includes an intermediate member with forks at two opposite sides thereof, one of said member forks being connected by relatively perpendicular pivots to a further fork and the latter being connected to one of said shaft segments.

3. A haymaking machine as claimed in claim 2, wherein said beam has lateral carriers at each opposite side with respective couplings and each carrier is tiltable upwardly through an angle in excess of 90° into an inoperative transport position relative to said beam, said shaft segments remaining drivable in the inoperative transport position.

4. A haymaking machine as claimed in claim 3, wherein said coupling is symmetrical in formation about the center thereof.

5. A haymaking machine as claimed in claim 3, wherein an axis about which said beam and carrier are relatively pivotable is spaced from a substantially horizontal plane containing the longitudinal axis of the main driving shaft segment and the latter is supported by said beam, said axis being in non-parallel relationship with the longitudinal axis of the driving shaft segment.

6. A haymaking machine as claimed in claim 1, wherein said rake members are rotatable about corresponding non-horizontal axes and ground wheels support the machine, said beam being provided to at least one lateral carrier, a rake member connected to said carrier at a location remote from the pivotal connection of said carrier to said beam, whereby the rake member on the carrier is pivotable upwardly and downwardly relative to said beam, said carrier mounting at least one guide for crop being displaced by the rake members during application.

7. A haymaking machine as claimed in claim 2, wherein the rake member on said carrier cooperates with at least one further rake member connected to said beam, and the two cooperating rake members are connected to the driving means for rotation in relative opposite directions.

8. A haymaking machine as claimed in claim 7, wherein each rake member has outwardly projecting lines and at least the outer working portions of said tines are contained in planes substantially perpendicular to the axes of rotation of their corresponding rake members, said tines being arranged in groups and each group being mounted on a corresponding tine the tine carriers being inclined upwardly and forwardly, away said tines with respect to the directions of operative rotation of said rake members.

9. A haymaking machine as claimed in claim 8, wherein each tine group includes helical coils around the corresponding tine carrier, and each tine group is angularly adjustable about the longitudinal axis of the corresponding coil, said longitudinal axis extending downwardly and forwardly from a point above said coil with respect to the direction of rotation.

10. A haymaking machine as claimed in claim 9, wherein a working portion of each tine is pivotable upwardly and downwardly about a pivot axis located adjacent the axis of rotation of the corresponding rake member, said pivot axis extending in a direction parallel to the axis of rotation and substantially tangentially with respect to a circle centered upon said axis of rotation.

11. A haymaking machine as claimed in claim 10, wherein the working portion of each tine is settable in a substantially radially extending position for tedding crop or a different position for forming crop into swaths.

12. A haymaking machine as claimed in claim 11, wherein in the swath forming position the working tine portion trails rearwardly with respect to the direction of rotation, from a radial line which contains the leading end of that portion.

13. A haymaking machine as claimed in claim 6, wherein, in a tedding position, a guide is positioned adjacent the outer end of said carrier remote from said beam, said guide being freely pivotable in vertical directions relative to said carrier, a lower portion of the guide sliding forwardly over the ground surface during operation.

14. A haymaking machine comprising a frame and at least one pair of rake members rotatably mounted on a beam of said frame, driving means connected to rotate adjacent members in relative opposite directions, said beam including interconnected parts that are relatively pivotable with respect to one another and said parts being joined with pivot means to comprise a coupling, said driving means including shaft means that forms part of said coupling, said shaft means comprising universal joint means that pivotally interconnects two shaft segments, said parts and segments being angularly displaceable with respect to one another about said pivot means and joint means while said shaft means remains operative to rotate said members during displacement, crop guides supported on respective beam parts and said guides being settable to lower working positions to the rear of said pair of rake members, at least one of said guides being settable in an upwardly displaced tedding position, above the path of crop being moved by said rake members.

15. A haymaking machine comprising a frame and pair of rake members rotatably mounted on a beam of said frame, driving means connected to rotate the members of each pair in relative opposite directions, said beam including at least two interconnected parts that are relatively pivotable with respect to one another, each part mounting a corresponding rake wheel and said parts being joined with pivot means to comprise a coupling, said driving means including shaft means that forms part of said coupling, said shaft means comprising a double universal joint that joins two shaft segments, said parts and segments being angularly displaceable with respect to one another about said pivot means and joint and said shaft means remaining operative to rotate said members during displacement, crop guides connected to said beam by respective fastening portions and at least one fastening portion being displceable towards or away from the other fastening portion, whereby said machine is convertible to a swath forming or a crop tedding working position.

16. A haymaking machine as claimed in claim 15, wherein the guides are both pivoted to plate means on said beam and the position of the fastening portion of a first guide remains unchanged by the displacement from a tedding working position to a swath-working position and vice versa.

17. A haymaking machine as claimed in claim 15, wherein the fastening locations of the guides can be the same or spaced apart, depending on the machine being arranged to function as a swath former or a tedder, respectively.

18. A haymaking machine as claimed in claim 15, wherein the displaceable guide portion is slideably mounted on a straight rod and changeable in position without substantial angular displacement.

19. A haymaking machine as claimed in claim 18, wherein in a swath forming position one of said guides is further advanced with respect to the direction of travel than it is when in the tedding position.

20. A haymaking machine as claimed in claim 19, wherein said rod extends outwardly in the same general direction as the beam but is non-parallel to the longitudinal axis of said beam.

21. A haymaking machine as claimed in claim 18, wherein in the swath forming position said guides are freely pivotable up and down, lower portions of said guides being slidable over the ground surface.

22. A haymaking machine as claimed in claim 18, wherein in the tedding position, at least one guide is displaced upwardly into an inoperative position and locking means retains said one guide in that position.

23. A haymaking machine comprising a frame and a plurality of rake members rotatably mounted on a beam of said frame, driving means connected to rotate said members, said beam including at least two interconnected carrier parts that are relatively pivotable with respect to the remainder of said beam and said parts being joined with pivot means to comprise a respective coupling, said driving means including shaft means that forms part of said coupling, said shaft means comprising a double universal joint that joins two shaft segments, said pivot means and joint being located adjacent one another and hydraulic means interconnecting said carrier parts to angularly displace these parts upwardly by at least 90° about their respective pivot means and joints, said shaft means remaining operative to rotate said members during displacement, said hydraulic means comprising a single fluid-pressure operated cylinder and piston assembly that interconnects the carrier parts.

24. A haymaking machine comprising a frame including a main beam connectable to a prime mover and a lateral carrier beam pivoted at each opposite end of said main beam, said main beam and the carrier beams each mounting at least one rotatable rake member, driving means connected to the rake members, each carrier beam being connected to the main beam by a pivot that defines a substantially horizontal axis and permits relative pivotal movements of said beams during operation, said driving means comprising a driving shaft housed in said main beam and shaft segments housed in the carrier beams, said segments being connected to the shaft by respective universal coupling means located adjacent a corresponding pivot, at least one of said carriers together with rake member and shaft segment being displaceable upwardly about the respective pivot and coupling means to a raised position, hydraulic means connected to said one carrier to effect the displacement to raised position, said hydraulic means being in a circuit with controls that lead to the prime mover, a latch device with recesses positioned to cooperate with a pin on said one carrier and retain that carrier in semi-raised and/or fully raised positions, said device being releasable by release means that leads to the prime mover.

25. A haymaking machine as claimed in claim 24, wherein a respective latch device is located adjacent each horizontal axis about which the carriers are turnable relative to said main beam.

26. A haymaking machine as claimed in claim 25, wherein each latch device comprises a latch member pivotally connected to the frame and two recesses arranged to cooperate with a respective latch pin on the respective carrier beam to prevent accidental displacement of the carrier beam, said release means being connected to each latch member and said member being pivotable by the release means to disengage the pin from any of the recesses.

* * * * *